Patented Aug. 26, 1924.

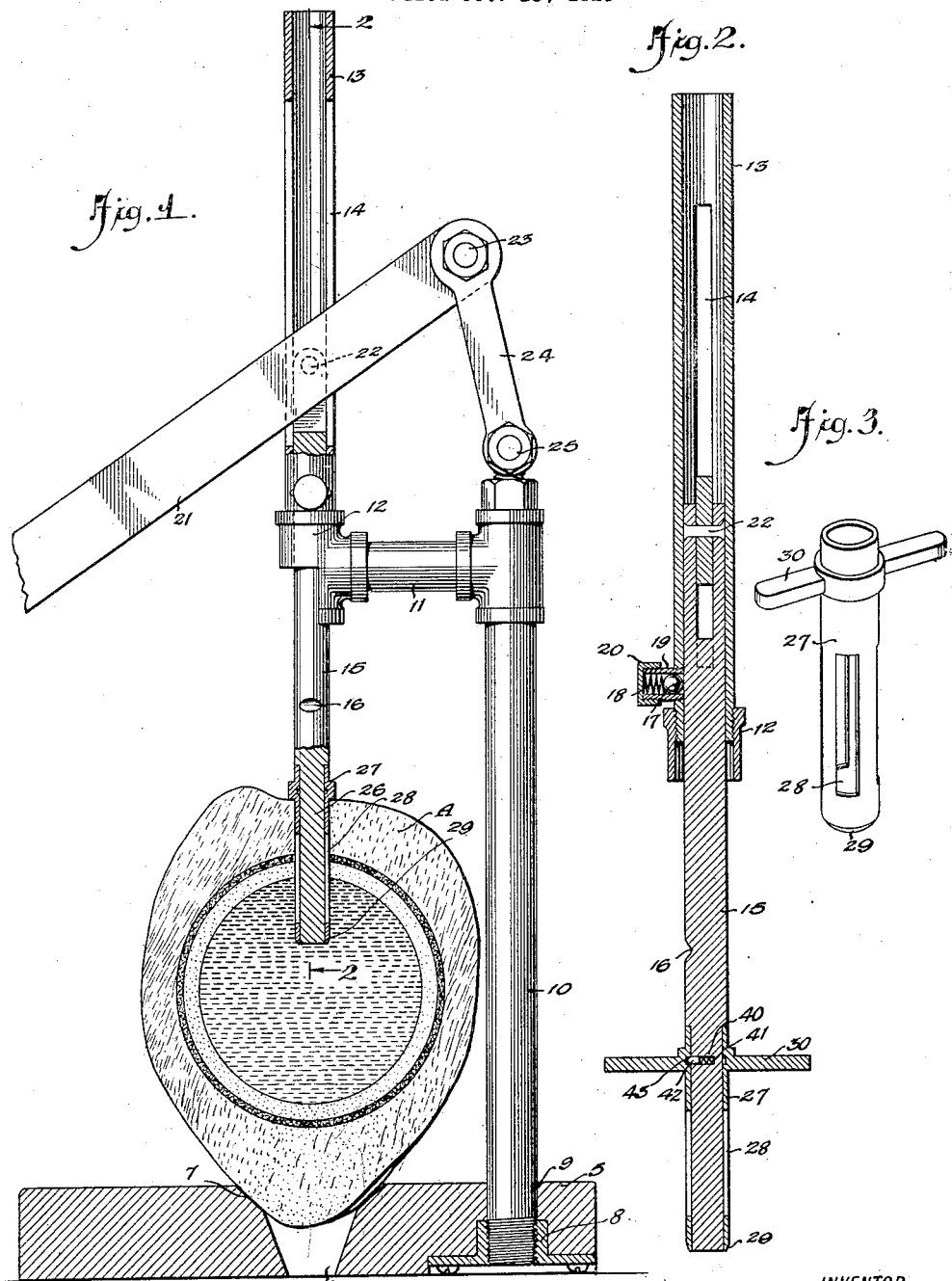

1,506,571

UNITED STATES PATENT OFFICE.

EMIL DEREMBERG, OF PENSACOLA, FLORIDA.

APPARATUS FOR EXTRACTING MILK FROM COCONUTS.

Application filed October 19, 1923. Serial No. 669,639.

*To all whom it may concern:*

Be it known that I, EMIL DEREMBERG, a citizen of the United States, and a resident of Pensacola, in the county of Escambia and State of Florida, have invented a new and Improved Apparatus for Extracting Milk from Coconuts, of which the following is a full, clear, and exact description.

The present invention relates to new and useful improvements in apparatus for extracting milk from coconuts.

It is one of the primary objects of the invention to provide an apparatus which will puncture the husk, shell and meat of a coconut to provide an opening through which the milk can be drained therefrom.

It is a further object of the invention to construct the perforating means in such a manner that it is retained in the coconut to provide a drain for the milk contained therein.

It is a still further object of the invention to construct the draining means in such a manner that it forms a strainer for the milk, thus preventing the discharge of foreign material which results from the puncturing operation.

With the above and other objects in view, reference is had to the accompanying drawings, in which—

Figure 1 is a view partly in elevation and partly in section of an apparatus constructed in accordance with the present invention;

Fig. 2 is a vertical sectional view taken on the line 2—2 of Fig. 1;

Fig. 3 is a detail perspective view of that portion of the apparatus forming the drain for the coconut.

Referring more particularly to the drawings, the reference numeral 5 designates a base, having an opening 6 the end of which is tapered as at 7. The base 5 is provided with an internally screw-threaded socket 8, and passing through an opening 9 in the base and having threaded engagement with the socket 8, is a standard 10. Mounted near the upper end of the standard 10, is a right-angularly disposed arm 11, and secured to said arm is a bracket 12. Secured to the bracket 12 and extending vertically therefrom, is a guide member 13, tubular in form and provided with diametrically disposed slots 14, and slidably mounted in the guide 13 is a plunger 15. This plunger 15 has a notch or cut-out portion 16, and adapted to engage with the notch or cut-out portion 16, is a ball 17, said ball being pressed forwardly by means of a spring 18. This ball 17 and spring 18 are mounted in a relatively small housing 19 closed by a cap 20, which housing is located at a point above the bracket 12 heretofore mentioned. The plunger 15 is adapted to be reciprocated in the guide member 13 by means of a lever 21, which lever is pivotally connected to the plunger 15, as at 22. Pivotally secured to the end of the lever 21, as at 23, is a link 24, which link is pivotally connected, as at 25, to the upper end of the standard 10.

The lower end of the plunger 15 is reduced as shown at 26, and adapted for engagement with said reduced portion is a tubular member 27. This tubular member 27 is more clearly shown in Fig. 3 and is provided with a plurality of slots or cut-out portions 28 in its body portion. The lower end of this tubular member is provided with a cutting edge 29, and its upper end is provided with a T-head 30, or the like.

To retain the tubular member 27 on the reduced end of the plunger 15, the plunger is cut out as at 40, and mounted in the cut-out portion is a coil spring 41, which forces a pawl 42 into engagement with the recess 43 formed in the tubular member 27. This construction, however, does not lock the two members together, but merely secures them against accidental displacement, and, at the same time, permitting the reduced end being withdrawn from the tubular member.

The device operates in the following manner:

A coconut, such as designated by the reference character A, is positioned on the base with the tapered end of the nut in engagement with the opening 6 of the base. This is accomplished with the lever 21 in its elevated position. The tubular member 27 is then positioned upon the reduced end of the plunger 15, and upon depressing the lever the tubular member is forced through the husk, shell and meat of the coconut to the position shown in Fig. 1, and the plunger is then withdrawn. After the plunger has been withdrawn, it is only necessary to invert the coconut and the milk contained therein will drain outwardly through the tubular member 27 through the slots or cut-out portions 28 therein. The milk in passing through the tubular member will be strained, thus retaining the refuse of the puncturing operation within the coconut to be removed when the coconut is broken open to procure, the meat thereof. After the milk has been drawn from the coconut, the T-head 30 of the tubular member 27 is withdrawn from the coconut for a future use.

While in the drawings the standard 10 is shown as a rigid construction and not adjustable, it is obvious that this standard may be made adjustable for adapting the machine to coconuts of various sizes without departing from the spirit of the invention.

During the draining of the coconut and when the plunger is in its uppermost position, it is retained in this uppermost position by engagement of the spring-pressed ball 17 with the notch or cut-out portion 16 in the plunger.

What is claimed is:

1. An apparatus for extracting milk from coconuts comprising a coconut supporting base, tubular means for puncturing the coconut and operating means for said tubular puncturing means, said tubular puncturing means being detachable with respect to its operating means to provide a drain for the coconut.

2. An apparatus for extracting milk from coconuts comprising a coconut supporting base, a perforating tool, and means for operating said perforating tool, said operating means serving to leave the perforating tool in the coconut to form a drain therefor.

3. In an apparatus for puncturing coconuts, a base, a standard carried by said base, a guide member carried by said standard, a plunger slidably mounted in said guide member, a tubular member adapted to puncture a coconut, said tubular member being operated by said plunger, and a pivoted lever adapted to operate said plunger.

4. An apparatus for extracting milk from coconuts, comprising a coconut supporting base, a slotted tubular puncturing element adapted to puncture the coconut and serve as means for removing the milk therefrom, and a plunger adapted to be temporarily received within the slotted tubular puncturing means to cause the same to puncture the coconut and subsequently to be withdrawn therefrom to permit of the tubular element serving its purpose as a milk-removing means.

5. An apparatus for extracting milk from coconuts comprising a slotted tubular coconut puncturing element, a plunger adapted to be received within the slotted tubular puncturing element for forcing the same through a coconut husk, and shell, and means carried by said plunger for retaining the slotted tubular puncturing element in position on the plunger during the puncturing operation, said means permitting of a removal of the plunger with respect to the slotted tubular element subsequent to the puncturing operation.

EMIL DEREMBERG.